United States Patent [19]

Yoshida

[11] Patent Number: 4,980,396
[45] Date of Patent: Dec. 25, 1990

[54] PRIMER COMPOSITION

[75] Inventor: Hirofumi Yoshida, Gunma, Japan

[73] Assignee: Toshiba Silicone Co., Ltd., Tokyo, Japan

[21] Appl. No.: 359,812

[22] Filed: Jun. 1, 1989

[30] Foreign Application Priority Data

Jun. 3, 1988 [JP] Japan ................. 63-136740

[51] Int. Cl.$^5$ ............................................. C08K 9/06
[52] U.S. Cl. ................................... 523/212; 523/213;
524/100; 524/188; 524/315; 524/360; 524/367;
524/720; 524/730; 524/751; 524/770; 524/773;
524/789; 524/860; 524/864; 528/34; 528/40;
528/41; 528/42
[58] Field of Search ................... 528/34, 33, 40, 41,
528/42; 524/315, 360, 367, 773, 100, 188, 720,
730, 860, 864, 789, 770, 751; 523/212, 213

[56] References Cited

U.S. PATENT DOCUMENTS

| | | | |
|---|---|---|---|
| 3,517,001 | 6/1970 | Berger | 525/477 |
| 3,896,123 | 7/1975 | DeZuba et al. | 260/248 |
| 4,395,507 | 7/1983 | Dziark et al. | 524/720 |
| 4,525,400 | 6/1985 | Suprenant | 528/34 |

FOREIGN PATENT DOCUMENTS 59-81364 5/1984 Japan .
1349311 4/1974 United Kingdom .

Primary Examiner—Melvyn I. Marquis
Attorney, Agent, or Firm—Sughrue, Mion, Zinn, Macpeak & Seas

[57] ABSTRACT

A primar composition comprising
(A) 100 parts by weight of an organo-polysiloxane represented by the formula (1)

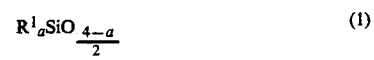

wherein $R^1$ represents a substituted or unsubstituted monovalent hydrocarbon group, and a is a number of from 1.98 to 2.01, provided that 25 to 50 mol % of the hydrocarbon group is a perfluoroalkyl group and 0.01 to 10 mol % of the hydrocarbon group is a vinyl group, said organo-polysiloxane having a viscosity as measured at 25° C. of 1,000,000 centistokes or more;

(B) 5 to 100 parts by weight of a silica type filler;

(C) 0.5 to 50 parts by weight of isocyanurate-type organosilicon compound represented by the formula (2)

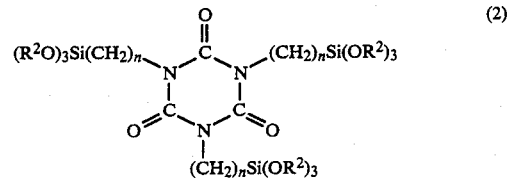

wherein $R^2$ represents an alkyl group, a fluoroalkyl group or an alkoxyalkyl group, each having 1 to 5 carbon atoms in the alkyl moiety, and n is an integer of 1 to 5; and (D) a desired amount of an organic solvent.

9 Claims, No Drawings

PRIMER COMPOSITION

FIELD OF THE INVENTION

This invention relates to a primer composition which is particularly useful to strongly adhere a fluorosilicone rubber to metal, plastic, etc., and enables a fluorosilicone rubber to be vulcanized and strongly adhere to such a substrate through an atmospheric hot-air vulcanization, without the necessity of applying a high pressure as in a press vulcanization.

BACKGROUND OF THE INVENTION

Fluorosilicone rubbers have excellent heat resistance, low temperature resistance, resistance to chemicals, etc., and are used in various fields. However, they have difficulties in adhesion to metal, plastic or the like, and their use for composite materials comprising combinations of fluorosilicone rubbers with metal, plastic, etc., has been limited.

In view of the above, there have been proposed treatments of the surface of a substrate such as metal, plastic, etc., with a primer in order to attain strong adhesion of a fluorosilicone rubber or its coating to such a substrate. For those treatements, various primer compositions have been proposed.

Primer compositions of this type are known as described in, for example, JP-B-53-14580 and JP-A-59-182865. (The terms "JP-B" and "JP-A" as used herein mean an "examined Japanese patent publication" and an "unexamined published Japanese patent application", respectively.) However, in order to obtain a sufficient adhesion-improving effect of those primer compositions, a fluorosilicone rubber and a substrate treated with those primer compositions should be pressed together at a high temperature under a high pressure for a relatively long period of time, since they hardly adhere to each other if the curing is conducted by an atmospheric hot-air vulcanization. Further, those primer compositions are still insufficient in adhesive properties when used in the adhesion of fluorosilicone rubbers to plastics such as nylon and polyethylene terephthalate.

SUMMARY OF THE INVENTION

Accordingly, an object of the present invention is to provide a primer composition which enables fluorosilicone rubbers to exhibit strong adhesions to various substrates including metal, plastic, and the like through either press vulcanization or atmospheric hot-air vulcanization, thus eliminating the above-described disadvantages of the prior art primer compositions.

DETAILED DESCRIPTION OF THE INVENTION

The present inventors have made extensive studies to develop a primer composition which is free from the problems of the conventional primer compositions. As a result, they have found that a primer composition comprising specific components as described below can satisfactorily overcome those problems.

The primer composition according to the present invention comprises the following essential components:

(A) 100 parts by weight of an organopolysiloxane represented by the formula (1)

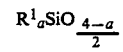

wherein $R^1$ represents a substituted or unsubstituted monovalent hydrocarbon group, and a is a number of from 1.98 to 2.01, provided that 25 to 50 mol% of the hydrocarbon group is a perfluoroalkyl group and 0.01 to 10 mol% of the hydrocarbon group is a vinyl group, and having a viscosity as measured at 25° C. of 1,000,000 centistokes or more;

(B) 5 to 100 parts by weight of a silica-type filler;

(C) 0.5 to 50 parts by weight of an isocyanurate-type organosilicon compound represented by the formula (2)

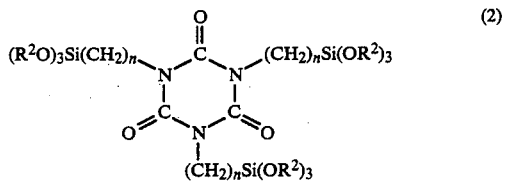

wherein $R^2$ represents an alkyl group, a fluoroalkyl group or an alkoxyalkyl group, each having 1 to 5 carbon atoms in the alkyl moiety, and n is an integer of 1 to 5; and (D) a desired amount of an organic solvent.

The primer composition of this invention will be described in detail below.

The organopolysiloxane, component (A), is essential to increase the adhesion of fluorosilicone rubbers to metal or plastic by particularly improving the adhesion between the primer layer and the fluorosilicone rubber, and also impart good coating properties and storage stability to the primer composition.

In the above formula (1), $R^1$ represents a substituted or unsubstituted monovalent hydrocarbon group, and specific examples thereof include methyl, ethyl, propyl, phenyl, β-phenylethyl, etc. In this organopolysiloxane, 25 to 50 mol% of the hydrocarbon group should be perfluoroalkyl groups such as 3,3,3-trifluoropropyl, 3,3,4,4,4-pentafluorobutyl, or the like, and 0.01 to 10 mol% thereof should be vinyl groups. If the perfluoroalkyl group content is lower than 25 mol%, the adhesion between the primer and a fluorosilicone rubber becomes poor, and if perfluoroalkyl group content exceeds 50 mol%, cost of the primer composition is increased and no further improvement in adhesion properties can be obtained. Further, the vinyl group serves to form chemical bonds between a fluorosilicone rubber and the primer layer during the vulcanization of the flurosilicone rubber with an organic peroxide or the addition reaction vulcanization of the rubber. Hence, if the vinyl group content is below 0.01 mol%, almost no chemical bonds are formed between the fluorosilicone rubber and the primer layer, resulting in poor adhesion. If the content is higher than 10 mol%, the resulting primer composition shows poor heat resistance. The preferred vinyl group content is 0.1 to 3.0%.

Further, the organoclysiloxane as component (A) should have a viscosity as measured at 25° C. of 1,000,000 centistokes or more, preferably 2,000,000 to 7,000,000 centistokes. This is because an organopolysiloxane having a viscosity lower than 1,000,000 centistokes gives a primer composition which is poor in air-drying properties, and disadvantageously forms a tacky layer.

The silica-type filler, component (B), in the primer composition of this invention is essential to improve both the strength of a dried primer layer and the adhesion of the primer composition. Examples of the filler include reinforcing silica having a specific surface area of 50 m$^2$/g or more such as fumed silica, precipitated silica, calcined silica obtained therefrom, and silica aerogel; and non-reinforcing silica such as ground quartz and diatomaceous earth. Those silica-type fillers may be used as they are, or may be used after being made hydrophobic with a surface-treating agent such as an organosilane, a diorganopolysiloxane or a hexaorganodisilazane. The fillers can be used alone or as mixture thereof.

The amount of component (B) incorporated in the primer composition is selected from the range of from 5 to 100 parts, preferably 10 to 50 parts, by weight per 100 parts by weight of component (A). If the amount of component (B) is blow 5 parts by weight, the resulting primer composition cannot give a primer layer having a sufficient strength and also shows poor adhesion. If the amount thereof is larger than 100 parts by weight, the resulting primer composition is disadvantageously poor in storage stability.

The isocyanurate-type organosilicon compound, component (C), in the primer composition of this invention serves to improve the adhesion of the primer composition. Examples of the group R$^2$ in the formula (2) include an alkyl group (such as methyl, ethyl, propyl or butyl), a fluoroalkyl group (such as trifluoroethyl or trifluoropropyl) and an alkoxyalkyl group (such as methoxyethyl or ethoxyethyl).

The subscript n in the formula (2) is selected from the integers of from 1 to 5 from the standpoints of the easy synthesis and handling of the organosilicon compound. It is particularly preferred that n is 3 from the standpoints of the resistance of the organosilicon compound to hydrolysis, the long-lasting adhesion of the primer composition, and the easy synthesis of the organosilicon compound.

The amount of component (C) in the primer composition is in the range of from 0.5 to 50 parts by weight per 100 parts by weight of component (A). If the amount of component (C) is below 0.5 part by weight, a sufficient adhesion-improving effect cannot be obtained. If the amount thereof exceeds 50 parts by weight, it is disadvantageous in that the resulting primer composition is poor in air-drying properties and storage stability.

The organic solvent, component (D), in the primer composition of this invention contributes to dissolve and disperse components (A) to (C), and impart a proper viscosity to the resulting primer composition, thus making primer-coating operations easy. A preferred organic solvent as component (D) is a solvent having good compatibility and affinity with each of components (A) to (C). Examples of such a solvent include acetone, ethyl acetate, butyl acetate, cyclohexanone, tetrahydrofuran, methyl ethyl ketone, methyl isobutyl ketone, and the like. The amount of component (D) added is not particularly limited and a desired amount thereof can be added. However, the amount of component (D) added to the primer composition is generally from 200 to 800 parts, preferably 400 to 600 parts, by weight per 100 parts by weight of component (A).

As described above, the primer compositions of this invention comprises the four components, components (A) to (D), as essential ingredients. In addition to those components, the primer composition may suitably contain an inorganic filler, a pigment, a silane coupling agent and an organic peroxide, so long as the additives used do not impair the effects of this invention.

The primer composition of the present invention is coated on various substrates to be adhered with fluorosilicone rubbers by coating the primer composition on the surfaces of the substrates or by dipping the substrates in the primer composition. After coating, the primer composition coated is air-dried at room temperature for about 30 to 60 minutes, so that the resulting substrates can be used in molding processes. Further, the coated primer composition may be subjected to baking at 150° to 250° C. for about 1 to 60 minutes to form a strong primer layer without impairing its adhesive strength, whereby the primer layer can be prevented from flowing.

The primer composition of this invention can be applied to various substrates including metal, plastic, rubber and ceramic. Specific examples of such applications include the preparation of a composite oil seal and gasket for automobiles, the preparation of diaphragms, the adhesion of a core metal to a fluorosilicone rubber in the manufacture of rollers for copying machines, and the manufacture of various sheets containing metals, woven fabrics, etc., as substrates. The flurosilicone rubbers which are advantageously employed in such application are rubbers having a fluorohydrocarbon group such as a 3,3,3-trifluoropropyl group. Particularly preferred examples thereof are an organic peroxide-vulcanizable fluorosilicone rubber and an addition reaction-type fluorosilicone rubber. However, the primer composition of the invention can also be applied, with satisfactory results, to the adhesion of a condensation type room temperature-curable fluorosilicone rubbers, depending upon the substrate.

The present invention will be described in more detail by reference to the following Examples and Comparative Examples, but the Examples should not be construed to be limiting the scope of the invention. In the Examples and Comparative Examples, all parts are by weight, and Me and Et mean $CH_3$ and $C_2H_5$, respectively.

EXAMPLE 1

Into a kneader was introduced 100 parts of methyl(3,3,3-trifluoropropyl) polysiloxane having a viscosity as measured at 25° C. of 5,000,000 centistokes in which both ends of the molecule had been blocked with a trimethylsilyl group and the molecule consisted of 98 mol% of methyl(3,3,3-trifluoropropyl)siloxane units and 2.0 mol% of methylvinylsiloxane units. 20 Parts of fumed silica having a specific surface area of 200 m$^2$/g which had been surface-treated with tri[methyl(3,3,3-trifluoropropyl)]cyclotrisiloxane was added thereto and the resulting mixture was kneaded until it became uniform, thereby obtaining a compound (Compound A).

120 Parts of Compound A was dissolved in 600 parts of ethyl acetate. To 720 parts of this ethyl acetate solution was added 2 parts of the isocyanurate-type organosilicon compound as shown in Table 1, and the resulting mixture was stirred until it became uniform, thereby preparing a primer composition.

A woven fabric made of nylon and a woven fabric made of polyethylene terephthalate were dipped in the thus-obtained primer composition. The fabrics were taken out from the primer composition and then air-dried at room temperature for 60 minutes. A fluorosilicone rubber compound prepared by adding 1 part of 2,4-dichlorobenzoyl peroxide to 100 parts of FQE26U (trade name of a fluorosilicone rubber manufactured by Toshiba Silicone Co., Ltd., Japan) was tightly superposed at a thickness of 3 mm on both sides of each of those primer-treated woven fabrics. The resulting composites of rubber compound and fabrics were heated in an oven at 150° C. for 20 minutes, thereby allowing the rubber compound to cure and adhere to the fabrics. The resulting cured sheets were cut into test pieces having a width of 25.0 mm and a length of 120 mm, and the peeling adhesion strengths were measured in accordance with JIS K 6301. The results obtained are shown in Table 1.

Further, the state of the surfaces formed by the peeling was visually examined and the results are also shown in Table 1, in which symbol O shows a cohesive rubber failure of 80 to 100%, symbol Δ shows 50 to 80%, and symbol × shows below 50%.

The peeling test was conducted under the following conditions.
  Testing machine : Autograph (manufactured by Shimadzu Corporation, Japan)
  Cross-head speed: 50 mm/min
  Temperature 25° C.

Further, after the above-described 60 minute air drying of the coated primer, the degree of drying was evaluated by a finger test, and the results are given in Table 1, in which symbol O shows a sample free from tack, symbol Δ shows a slightly tacky sample, and symbol × shows a tacky sample. In Table 1 and also Tables 2 to 4 given later, the figures which indicate the amounts of components are parts by weight.

EXAMPLES 2 TO 4

Using Compound A as used in Example 1 and ethyl acetate, primer compositions were respectively prepared in the same manner as in Example 1 except that the amount of the isocyanurate-type organosilicon compound added was changed to 5 parts (Example 2), 10 parts (Example 3), and 30 parts (Example 4).

Using each of those primer compositions, test pieces for a peeling test, having the same size as that for Example 1, were prepared under the same conditions as in Example 1. Peeling adhesion strengths were measured on those test pieces under the same conditions as in Example 1, and the state of the surfaces formed by the peeling and the air-drying characteristics of the primer compositions were also examined and evaluated. The composition of the primer compositions and the results obtained are shown in Table 1.

COMPARATIVE EXAMPLE 1

120 Parts of Compound A as used in Example 1 was dissolved in 600 parts of ethyl acetate, and the resulting mixture was stirred until it became uniform, thereby preparing a primer composition. Using this primer composition, test pieces for a peeling test, having the same size as that for Example 1, were prepared under the same conditions as in Example 1. Peeling adhesion strengths were measured on those test pieces under the same conditions as in Example 1, and the state of the surfaces formed by the peeling and the air-drying characteristics of the primer composition were also examined and evaluated. The composition of the primer composition and the results obtained are shown in Table 1.

COMPARATIVE EXAMPLE 2

Using Compound A as used in Example 1 and ethyl acetate, a primer compositon was prepared in the same manner as in Example 1 except that the amount of the isocyanurate-type organosilicon compound added was changed to 100 parts.

Using this primer composition, test pieces for a peeling test, having the same size as that for Example 1, were prepared under the same conditions as in Example 1. Peeling adhesion strengths were measured on those test pieces under the same conditions as in Example 1, and the state of the surfaces formed by the peeling and the air-drying characteristics of the primer composition were also examined and evaluated. The composition of the primer composition and the results obtained are shown in Table 1.

TABLE 1

|   |   | Example | | | | Comparative Example | |
|---|---|---|---|---|---|---|---|
|   |   | 1 | 2 | 3 | 4 | 1 | 2 |
| (A) | Organopolysiloxane: Methyl(3,3,3-trifluoropropyl) polysiloxane*1 | 100 | 100 | 100 | 100 | 100 | 100 |
| (B) | Silica-type filler: Surface-treated fumed silica*2 | 20 | 20 | 20 | 20 | 20 | 20 |
| (C) | Isocyanurate-type organosilicon compound: $(MeO)_3Si(CH_2)_3$-N[C(=O)N((CH_2)_3Si(OMe)_3)C(=O)]_2N-(CH_2)_3Si(OMe)_3 (cyclic isocyanurate) | 2 | 5 | 10 | 30 | 0 | 100 |
| (D) | Organic solvent: Ethyl acetate | 600 | 600 | 600 | 600 | 600 | 600 |
| Peeling adhesion strength (kgf/cm) | | | | | | | |
| Nylon | | 0.80 | 1.50 | 1.80 | 1.70 | 0.05 | 0.10 |

TABLE 1-continued

|  | Example | | | | Comparative Example | |
|---|---|---|---|---|---|---|
|  | 1 | 2 | 3 | 4 | 1 | 2 |
| Polyethylene terephthalate | 1.10 | 1.70 | 1.60 | 1.40 | 0.10 | 0.20 |
| State of surface formed by peeling |  |  |  |  |  |  |
| Nylon | Δ |  |  |  | x | x |
| Polyethylene terephthalate |  |  |  |  | x | x |
| Air-drying characteristics of primer composition |  |  |  | Δ |  | x |

*¹containing 2.0 mol % of methylvinylsiloxane units.
*²surface-treated with tri[methyl(3,3,3-trifluoropropyl)] cyclotrisiloxane and having a specific surface area of 200 m²/g.

EXAMPLE 5

Into a kneader was introduced 100 parts of a methyl(3,3,3-trifluoropropyl)siloxane-dimethylsiloxane copolymer having a viscosity as measured at 25° C. of 7,000,000 centistokes in which both ends of the molecule had been blocked with a trimethylsilyl group and the molecule consisted of 75 mol% of methyl(3,3,3-trifluoropropyl)siloxane units, 0.3 mol% of methylvinylsiloxane units and 24.7 mol% of dimethylsiloxane units. 20 Parts of fumed silica which had been surface-treated with octamethylcyclotetrasiloxane and which had a specific surface area of 130 m²/g was added thereto, and the resulting mixture was kneaded until it became uniform, thereby obtaining a compound.

120 Parts of this compound was dissolved in 600 parts of ethyl acetate. To 720 parts of this ethyl acetate solution was added 5 parts of the same isocyanurate-type organosilicon compound as used in Example 1, and the resulting mixture was stirred until it became uniform, thereby preparing a primer composition. The composition of this primer composition is shown in Table 2.

This primer composition was coated on metal plates (SS41 specified in JIS G 3101) having a diameter of 40.56 mm and a thickness of 15 mm, and then air-dried for 60 minutes. A fluorosilicone rubber compound (35 mm in diameter, 5 mm in thickness) prepared by adding 0.5 part of 2,5-dimethyl-2,5-di(t-butylperoxy)hexane to 100 parts of FQE24U (trade name of a fluorosilicone rubber manufactured by Toshiba Silicone Co., Ltd., Japan) was placed between two metal plates thus treated with the primer composition. The rubber compound sandwiched between the metal plates were subjected to press vulcanization at a temperature of 170° C. under a pressure of 30 kg/cm² for 10 minutes, to thereby allow the rubber compound to cure and adhere to the metals, thus obtaining a test piece for the measurement of adhesion strength between the vulcanized rubber and the metals. A total of four test pieces of the same size were prepared under the same conditions.

The adhesion strengths of those test pieces were measured in accordance with JIS K 6301. After the measurement, the kind and percentage (%) of the resulting exposed layer or interface were visually evaluated on each test piece. The results obtained are shown in Table 2, in which the adhesion strength is shown as the average of four values.

The adhesion strength was measured under the following conditions.
  Testing machine : Autograph (manufactured by Shimadzu Corporation, Japan)
  Cross-head speed: 25 mm/min
  Temperature 25° C.

EXAMPLE 6

Into a kneader was introduced 100 parts of a methyl(3,3,3-trifluoropropyl)siloxane-dimethylsiloxane copolymer having a viscosity as measured at 25° C. of 2,000,000 centistokes in which both ends of the molecule had been blocked with a trimethylsilyl group and the molecule consisted of 50 mol% of methyl(3,3,3-trifluoropropyl)siloxane units, 0.3 mol% of methylvinylsiloxane units and 49.7 mol% of dimethylsiloxane units. 20 Parts of the same fumed silica as used in Example 5 was added thereto, and the resulting mixture was kneaded until it became uniform, thereby obtaining a compound.

120 Parts of this compound was dissolved in 600 parts of ethyl acetate. To 720 parts of the thus-obtained ethyl acetate solution was added 5 parts of the same isocyanurate-type organosilicon compound was used in Example 5, and the resulting mixture was stirred until it became uniform, thereby preparing a primer composition. The composition of this primer composition is shown in Table 2.

Using this primer composition, test pieces for an adhesion strength test having the same size as that for Example 5 were prepared under the same conditions as in Example 5. The adhesion strengths of those test pieces were measured under the same conditions as in Example 5. After the measurement, the kind and percentage (%) of the resulting exposed layer or interface were visually evaluated on each test piece. The results obtained are shown in Table 2.

COMPARATIVE EXAMPLE 3

Into a kneader was introduced 100 parts of dimethyl polysiloxane having a viscosity as measured at 25° C. of 4,000,000 centistokes in which both ends of the molecule had been blocked with a trimethylsilyl group and the molecule consisted of 0.3 mol% of methylvinylsiloxane units and 99.7 mol% of dimethylsiloxane units. 20 Parts of the same fumed silica as used in Example 5 was added thereto, and the resulting mixture was kneaded until it became uniform, thereby obtaining a compound.

120 Parts of this compound was dissolved in 600 parts of ethyl acetate. To 720 parts of the thus-obtained ethyl acetate solution was added 5 parts of the same isocyanurate-type organosilicon compound as used in Example 5, and the resulting mixture was stirred until it became uniform, thereby preparing a primer composition. The composition of this primer composition is shown in Table 2.

Test pieces of the same size as that for Example 5 were prepared using the above-obtained primer composition and their adhesion strengths were measured under the same conditions as in Example 5. After the measurement, the kind and percentage (%) of the resulting exposed layer or interface were visually evaluated. The results obtained are shown in Table 2.

compositions were respectively prepared in the same manner as in Example 7 except that the amount of the

TABLE 2

| | | Example | | Comparative Example |
|---|---|---|---|---|
| | | 5 | 6 | 3 |
| (A) | Organopolysiloxane: | | | |
| | Methyl(3,3,3-trifluoropropyl)-siloxane-dimethylsiloxane copolymer | 100*3 | 100*4 | — |
| | Dimethyl polysiloxane*5 | — | — | 100 |
| (B) | Silica-type filler: | | | |
| | Surface-treated fumed silica*6 | 20 | 20 | 20 |
| (C) | Isocyanurate-type organosilicon compound: | | | |
| | (structure shown below) | 5 | 5 | 5 |
| (D) | Organic solvent: | | | |
| | Ethyl acetate | 600 | 600 | 600 |
| | Adhesion strength (kgf/cm$^2$) | 18.5 | 15.4 | 2.0 |
| | Kind and percentage (%) of the layer or interface exposed by adhesion strength test | R(90%) R(100%) R(100%) | R(90%) R(95%) R(80%) R(95%) | RC(100%) RC(100%) RC(100%) RC(100%) |

$$(MeO)_3Si(CH_2)_3-N\overset{\overset{O}{\underset{\|}{C}}}{\underset{\underset{\|}{O}}{\phantom{C}}}N-(CH_2)_3Si(OMe)_3$$
$$\underset{(CH_2)_3Si(OMe)_3}{\underset{|}{N}}$$

R: Cohesive rubber failure
RC: Breakage between rubber and adhesive
*3 75 mol % of methyl(3,3,3-trifluoropropyl)siloxane units, 24.7 mol % of dimethylsiloxane units and 0.3 mol % of methylvinylsiloxane units.
*4 50 mol % of methyl(3,3,3-trifluoropropyl)siloxane units, 49.7% mol % of dimethylsiloxane units and 0.3 mol % of methylvinylsiloxane units.
*5 containing 0.3 mol % of methylvinylsiloxane units.
*6 surface-treated with octamethylcyclotetrasiloxane and having a specific surface area of 130 m$^2$/g.

EXAMPLE 7

Into a kneader was introduced 100 parts of methyl(3,3,3-trifluoropropyl) polysiloxane having a viscosity as measured at 25° C of 6,000,000 centistrokes in which both ends of the molecule had been blocked with a trimethylsilyl group and the molecule consisted of 95 mol% of methyl(3,3,3-trifluoropropyl)siloxane units and 5 mol% of methylvinylsiloxane units. 10 Parts of the same fumed silica as used in Example 1 was added thereto, and the resulting mixture was kneaded until it became uniform, thereby obtaining a compound.

110 Parts of the thus-obtained compound was dissolved in 400 parts of methyl ethyl ketone. To 510 parts of this methyl ethyl ketone solution was added 5 parts of the isocyanurate-type organosilicon compound as shown in Table 3, and the resulting mixture was stirred until it became uniform, thereby preparing a primer composition.

Using this primer composition, test pieces for a peeling test having the same size as that for Example 1 were prepared under the same conditions as in Example 1. The peeling adhesion strengths of those test pieces were measured under the same conditions as in Example 1.

Further, the state of the surfaces formed by the peeling and the air-drying characteristics of the primer composition were also examined and evaluated.

The composition of the primer composition and the results obtained are shown in Table 3.

EXAMPLES 8 TO 9

Using the same methyl(3,3,3-trifluoropropyl) polysiloxane and isocyanurate-type organosilicon compound as used in Example 7 and methyl ethyl ketone, primer fumed silica added was changed to 25 parts (Example 8) and 50 parts (Example 9).

Using each of those primer compositions, test pieces for a peeling test having the same size as that for Example 7 were prepared under the same conditions as in Example 7. The peeling adhesion strengths of those test pieces were measured under the same conditions as in Example 7.

Further, the state of the surfaces formed by the peeling and the air-drying characteristics of the primer compositions were also examined and evaluated.

The composition of the primer compositions and the results obtained are shown in Table 3.

COMPARATIVE EXAMPLE 4

100 Parts of the same methyl(3,3,3-trifluoropropyl) polysiloxane as used in Example 7 was dissolved in 400 parts of methyl ethyl ketone. To 500 parts of this methyl ethyl ketone solution was added 5 parts of the same isocyanurate-type organosilicon compound as used in Example 7, and the resulting mixture was stirred until it became uniform, thereby preparing a primer composition.

Using the thus-obtained primer composition, test pieces for a peeling test having the same size as that for Example 7 were prepared under the same conditions as in Example 7. The peeling adhesion strengths of those test pieces were measured under the same conditions as in Example 7.

Further, the state of the surfaces formed by the peeling and the air-drying characteristics of the primer composition were also examined and evaluated.

The composition of the primer composition and the results obtained are shown in Table 3.

Example 5. After the measurement, the kind and percentage (%) of the resulting exposed layer or interface

TABLE 3

|  | Example | | | Comparative Example |
|---|---|---|---|---|
|  | 7 | 8 | 9 | 4 |
| (A) Organopolysiloxane: | | | | |
| Methyl(3,3,3-trifluoropropyl) polysiloxane*7 | 100 | 100 | 100 | 100 |
| (B) Silica-type filler: | | | | |
| Surface-treated fumed silica*2 | 10 | 25 | 50 | 0 |
| (C) Isocyanurate-type organosilicon compound: | | | | |
| (structure shown below) | 5 | 5 | 5 | 0 |
| (D) Organic solvent: | | | | |
| Methyl ethyl ketone | 400 | 400 | 400 | 400 |
| Peeling adhesion strength (kgf/cm) | | | | |
| Nylon | 0.80 | 1.50 | 1.10 | 0.05 |
| Polyethylene | 1.85 | 1.70 | 1.10 | 0.10 |
| State of surface formed by peeling | | | | |
| Nylon | Δ | | | x |
| Polyethylene terephthalate | Δ | | | x |
| Air-drying characteristics of primer composition | Δ | | | x |

Structure of (C):

(EtO)₃Si(CH₂)₃—N(C=O)—N((CH₂)₃Si(OEt)₃)—C(=O)—N((CH₂)₃Si(OEt)₃)—C(=O) (isocyanurate ring)

*7 containing 5.0 mol % of methylvinylsiloxane units.
*2 surface-treated with tri[methyl(3,3,3-trifluoro-propyl)]cyclotrisiloxane and having a specific surface area of 200 m²/g.

EXAMPLE 10

Into a kneader was introduced 100 parts of the same methyl(3,3,3-trifluoropropyl) polysiloxane as used in Example 1. 20 Parts of fumed silica which had not been surface-treated and which had a specific surface area of 120 m²/g was added thereto, and the resulting mixture was kneaded until it became uniform, thereby obtaining a compound.

120 Parts of the thus-obtained compound was dissolved in 500 parts of ethyl acetate. To 620 parts of this ethyl acetate solution was added 10 parts of the isocyanurate-type organosilicon compound as shown in Table 4, and the resulting mixture was stirred until it became uniform, thereby preparing a primer composition. The composition of this primer composition is shown in Table 4.

Using this primer composition, test pieces for an adhesion strength test having the same size as that for Example 5 were prepared under the same conditions as in Example 5. The adhesion strengths of these test pieces were measured under the same conditions as in Example 5. After the measurement, the kind and percentage (%) of the resulting exposed layer or interface were visually evaluated on each test piece. The results obtained are shown in Table 4.

EXAMPLE 11

Using the same methyl(3,3,3-trifluoropropyl) polysiloxane and isocyanurate-type organosilicon compound as used in Example 10 and ethyl acetate, a primer composition was prepared in the same manner as in Example 10 except that precipitated silica having a specific surface area of 180 m²/g was used in place of the fumed silica.

Using this primer composition, test pieces for an adhesion strength test having the same size as that for Example 10 were prepared under the same conditions as in Example 10. The adhesion strengths of these test pieces were measured under the same conditions as in Example 10. After the measurement, the kind and percentage (%) of the resulting exposed layer or interface were visually evaluated. The composition of this primer composition and the results obtained are shown in Table 4.

TABLE 4

|  | Example | |
|---|---|---|
|  | 10 | 11 |
| (A) Organopolysiloxane: | | |
| Methyl(3,3,3-trifluoropropyl) polysiloxane*1 | 100 | 100 |
| (B) Silica-type filler: | | |
| Fumed silica*8 | 20 | — |
| Precipitated silica*9 | — | 20 |
| (C) Isocyanurate-type organosilicon compound: | | |

TABLE 4-continued

|  | Example | |
|---|---|---|
|  | 10 | 11 |
| 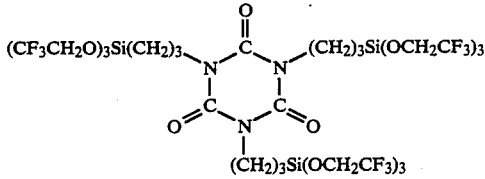 | 10 | 10 |
| (D) Organic solvent: | | |
| Ethyl acetate | 500 | 500 |
| Adhesion strength (kgf/cm²) | 14.8 | 13.2 |
| Kind and percentage (%) of the layer | R(85%) | R(70%) |
| or interface exposed by adhesion | R(80%) | R(75%) |
| strength test | R(70%) | R(70%) |
|  | R(80%) | R(80%) |

*¹containing 2.0 mol % of methylvinylsiloxane units.
*⁸specific surface area: 120 m²/g.
*⁹specific surface area: 180 m²/g.

While the invention has been described in detail and with reference to specific embodiments thereof, it will be apparent to one skilled in the art that various changes and modifications can be made therein without departing from the spirit and scope thereof.

What is claimed is:

1. A primer composition comprising
   (A) 100 parts by weight of an organopolysiloxane represented by the formula (1)

wherein $R^1$ represents a substituted or unsubstituted monovalent hydrocarbon group, and a is a number of from 1.98 to 2.01, provided that 25 to 50 mol% of the hydrocarbon group is a perfluoroalkyl group and 0.1 to 10 mol% of the hydrocarbon group is a vinyl group, said organopolysiloxane having a viscosity as measured at 25° C. of 1,000,000 centistokes or more;
   (B) 5 to 100 parts by weight of a silica filler;
   (C) 0.5 to 50 parts by weight of an isocyanurate-type organosilicon compound represented by the formula (2)

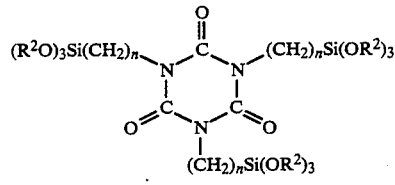

wherein $R^2$ represents an alkyl group, a fluoroalkyl group or an alkoxyalkyl group, each having 1 to 5 carbon atoms in the alkyl moiety, and n is an integer of 1 to 5; and
   (D) an organic solvent, wherein said solvent is present in an amount sufficient to dissolve and disperse components (A) to (C) and provide a viscosity adequate for coating.

2. The primer composition as claimed in claim 1, wherein the substituted or unsubstituted monovalent hydrocarbon group representing the balance of the $R^1$ groups is a substituted or unsubstituted monovalent hydrocarbon group is methyl, ethyl, propyl, phenyl or β-phenylethyl.

3. The primer composition as claimed in claim 1, wherein the perfluoroalkyl group is 3,3,3-trifluoropropyl or 3,3,4,4-pentafluorobutyl.

4. The primer compositon as claimed in claim 1, wherein the filler is fumed silica, precipitated silica, calcined silica, silica aerogel, ground quartz or diatomaceous earth.

5. The primer composition as claimed in claim 1, wherein the silica filler is surface treated with a surface-treating agent for silica filler.

6. The primer composition as claimed in claim 1, wherein $R^2$ in the formula (2) is methyl, ethyl, propyl, butyl, trifluoroethyl, trifluoropropyl, methoxyethyl or ethoxylethyl.

7. The primer compositon as claimed in claim 1, wherein n in the formula (2) is 3.

8. The primer composition as claimed in claim 1, wherein the amount of the organic solvent is 200 to 800 parts by weight per 100 parts by weight of component (A).

9. The primer composition as claimed in claim 1, wherein the organic solvent is acetone, ethyl acetate, butyl acetate, cyclohexanone, tetrahydrofuran, methyl ethyl ketone or methyl isobutyl ketone.

* * * * *